United States Patent
Lee et al.

(12) United States Patent (10) Patent No.: US 11,082,676 B2
(45) Date of Patent: Aug. 3, 2021

(54) DISPLAY DEVICE HAVING WHITE BALANCE ADJUSTING MODULE AND WHITE BALANCE ADJUSTING METHOD THEREOF

(71) Applicants: HKC CORPORATION LIMITED, Guangdong (CN); CHONGQING HKC OPTOELECTRONICS TECHNOLOGY CO., LTD., Chongqing (CN)

(72) Inventors: Chia-Hang Lee, Chongqing (CN); Jing-Ren Shi, Chongqing (CN)

(73) Assignees: HKC Corporation Limited, Shenzhen (CN); Chongqing HKC Optoelectronics Technology Co., Ltd., Chongqing (CN)

(*) Notice: Subject to any disclaimer, the term of this patent is extended or adjusted under 35 U.S.C. 154(b) by 0 days.

(21) Appl. No.: 16/639,476

(22) PCT Filed: Dec. 13, 2017

(86) PCT No.: PCT/CN2017/115908
§ 371 (c)(1),
(2) Date: Feb. 14, 2020

(87) PCT Pub. No.: WO2019/033640
PCT Pub. Date: Feb. 21, 2019

(65) Prior Publication Data
US 2021/0027726 A1  Jan. 28, 2021

(30) Foreign Application Priority Data
Aug. 16, 2017 (CN) .......................... 201710703219.1

(51) Int. Cl.
*H04N 9/31* (2006.01)
*H04N 9/73* (2006.01)
(Continued)

(52) U.S. Cl.
CPC .............. *H04N 9/73* (2013.01); *G09G 3/3607* (2013.01); *G09G 5/06* (2013.01); *H04N 9/3182* (2013.01);
(Continued)

(58) Field of Classification Search
CPC .......... G09G 3/3607; H04N 1/60; H04N 9/73; H04N 9/3182
See application file for complete search history.

(56) References Cited

U.S. PATENT DOCUMENTS

| | | | |
|---|---|---|---|
| 2012/0188265 A1* | 7/2012 | Suzuki | G09G 5/06 345/589 |
| 2012/0206478 A1* | 8/2012 | Nakamura | G09G 5/06 345/589 |
| 2013/0201224 A1* | 8/2013 | Kang | G09G 5/02 345/690 |

FOREIGN PATENT DOCUMENTS

| | | |
|---|---|---|
| CN | 101241690 A | 8/2008 |
| CN | 102237025 A | 11/2011 |

(Continued)

*Primary Examiner* — Roy P Rabindranath
(74) *Attorney, Agent, or Firm* — Muncy, Geissler, Olds & Lowe, P.C.

(57) ABSTRACT

A display device and a white balance adjusting method of the display device are provided. The white balance adjusting method comprises the following steps: measuring a stimulus value of each of gray scales of each of pixels of a panel; defining a highest voltage of each of the pixels at a maximum of the stimulus value; re-defining a white highest voltage using a first white balance pixel look-up table according to the highest voltage of each of the pixels; defining a target value for a white balance color pixel degree adjustment according to the white highest voltage and a corresponding white chromaticity; and acquiring an adjusted second white balance pixel look-up table to complete a white balance adjustment of the display device.

17 Claims, 4 Drawing Sheets

(51) Int. Cl.
*G09G 3/36* (2006.01)
*G09G 5/06* (2006.01)

(52) U.S. Cl.
CPC ............... *G09G 2300/0452* (2013.01); *G09G 2320/0666* (2013.01); *G09G 2320/0673* (2013.01); *G09G 2320/0693* (2013.01)

(56) References Cited

FOREIGN PATENT DOCUMENTS

| | | |
|---|---|---|
| CN | 102394041 A | 3/2012 |
| JP | H11338407 A | 12/1999 |
| JP | 2003295813 A | 10/2003 |

\* cited by examiner

DISPLAY DEVICE HAVING WHITE BALANCE ADJUSTING MODULE AND WHITE BALANCE ADJUSTING METHOD THEREOF

BACKGROUND OF THE INVENTION

Field of Invention

This disclosure relates to a technical field of a display, and more particularly to a display device and a white balance adjusting method of the display device.

Related Art

With the development and progress of the technology, the liquid crystal display having the thin body, the power-saving and low-radiation features has become the mainstream product of the display, and various displays are widely applied to various aspects of life.

The white balance property of the display is an important indicator of the color quality of the display. In general, the liquid crystal display needs the white balance adjustment to keep the white chromaticity of each of the gray scales at the constant level; or otherwise the color representation of the display is distorted.

According to the driving principle of the liquid crystal display, the white chromaticity of the display relates to the drive voltages of the corresponding red, green and blue pixels. For the white frame, the red, green and blue pixels are driven by the same voltage. However, regarding the opto-electronic property of the liquid crystal under different voltages, different rotating angles of the liquid crystal molecules cause different opto-electronic effects. Thus, under different driving voltages, the caused white chromaticity is drifted. How to appropriately adjust the corresponding red, green and blue voltages of each of the gray scales of the white to calibrate the white chromaticity is a very important work for the display. How to better finish the white balance adjustment work is a problem to be solved by those skilled in the art.

The background includes information that may be useful in understanding the present disclosure. It is not an admission that any of the information provided herein is prior art or relevant to the presently claimed disclosure.

SUMMARY OF THE INVENTION

In view of the above-mentioned drawbacks of the existing art, the technical problem to be solved by this disclosure is to provide a display device and a white balance adjusting method thereof, wherein a transmission rate of the overall panel is enhanced without the problem of the gray scale reversal or the discontinuous look-up table.

To achieve the above objective, the disclosure discloses a white balance adjusting method of a display device. The method comprises the following steps. Measuring a stimulus value of each of gray scales of each of pixels of a panel. Defining a highest voltage of each of the pixels at a maximum of the stimulus value. Re-defining a white highest voltage using a first white balance pixel look-up table according to the highest voltage of each of the pixels. Defining a target value for a white balance color pixel degree adjustment according to the white highest voltage and a corresponding white chromaticity. And, acquiring an adjusted second white balance pixel look-up table to complete a white balance adjustment of the display device.

Furthermore, the pixel includes a red pixel, a green pixel and a blue pixel. In this embodiment, the pixel may includes a red pixel, a green pixel and a blue pixel. In this case, the wavelength of the blue pixel is shorter, and the row inversion occurs first, but the stimulus value can restrict its highest voltage to a maximum of the stimulus value. Meanwhile, the highest voltages of the green pixel and the blue pixel can be increased according to the maximum of the stimulus value, the white highest gamma voltage (the voltage of the gray scale of 255 in the 8-bit condition) can be increased to effectively increase the transmission rate of the panel.

Furthermore, the stimulus value of each of the gray scales of each of the pixels includes the three-coordinate system stimulus value of the red pixel corresponding to each of the gray scales in the standard chromaticity system, the three-coordinate system stimulus value of the green pixel corresponding to each of the gray scales in the standard chromaticity system and the three-coordinate system stimulus value of the blue pixel corresponding to each of the gray scales in the standard chromaticity system. In this embodiment, measuring the three-coordinate system stimulus values of the three primary colors corresponding to each of the gray scales in the standard chromaticity system can subsequently define the highest voltages of the red, green and blue pixels at the highest values of the stimulus values, thus increase the white highest gamma voltage and thus increase the overall transmission rate of the panel.

Furthermore, after the step of measuring the stimulus value of each of the gray scales of each of the pixels of the panel, the method further includes: finding out reversal gray scale values of the red pixel, the green pixel and the blue pixel of each of coordinate systems in a standard chromaticity system. In this embodiment, because the blue wavelength is shorter, it is usually reversed earlier than the red and green. So, the voltage before the blue reversal point is selected, and the gamma highest voltage is restricted to the specific position of about the gray scale of 240. This disclosure defines the highest voltage of each of the pixels at a maximum of the stimulus value according to the maximum of the stimulus value, thereby restricting the highest voltage of the blue look-up table, while increasing the highest voltages of the green look-up table and the red look-up table. Thus, the white highest gamma voltage is increased (the voltage of the gray scale of 255 in the 8-bit condition) to increase the transmission rate of the overall panel without the problem of the gray scale reversal or the discontinuous look-up table.

Furthermore, after the step of defining the white highest voltage and the corresponding white chromaticity at the target value for the white balance color pixel degree adjustment, the method further includes: using a root-mean-square minimum error method to calculate to obtain red pixel, green pixel and blue pixel look-up tables of each of the gray scales corresponding to an adjusted white to serve as an adjusted second white balance pixel look-up table to keep a white brightness gamma value to be equal to 2.2. In this embodiment, the white highest voltage obtained using the second white balance pixel look-up table can reach the voltage level of the gray scale of 255 in the 8-bit condition. Compared with the brightness falling at about the gray scale of 240 obtained using the first white balance pixel look-up table, the enhancement is about 5%, so that the transmission rate and the color representation performance of the panel are effectively enhanced.

Furthermore, the white brightness gamma value equal to 2.2 satisfies the following formulas:

$$Y(R\text{-LUT})+Y(G\text{-LUT})+Y(B\text{-LUT})=\text{gamma}2.2; \text{ and} \quad 1)$$

$$\text{Min}((Wx-Wx0)^2+(Wy-Wy0)^2). \quad 2)$$

Y represents the Y coordinate system in the standard chromaticity system, R represents the gray scale value of the red pixel under different gray scale voltages, G represents the gray scale value of the green pixel under the different gray scale voltages, B represents the gray scale value of the blue pixel under different gray scale voltages, and LUT represents the gray scale value corresponding to each color of the second white balance pixel look-up table in different gray scale voltages. Wx represents the coordinate value of the white chromaticity X coordinate system, Wy represents the coordinate value of the white brightness Y coordinate system, Wx0 represents the coordinate value of the dark state white chromaticity X coordinate system, and Wy0 represents the coordinate value of the dark state white chromaticity Y coordinate system. In this embodiment, the white balance restricting condition similar to the first white balance pixel look-up table is used, but the adjustment is performed.

Furthermore, the pixel includes a red pixel, a green pixel and a blue pixel. A stimulus value of each of gray scales of each of pixels includes the three-coordinate system stimulus value of the red pixel corresponding to each of the gray scales in the standard chromaticity system, the three-coordinate system stimulus value of the green pixel corresponding to each of the gray scales in the standard chromaticity system and the three-coordinate system stimulus value of the blue pixel corresponding to each of the gray scales in the standard chromaticity system. After the step of defining the white highest voltage and the corresponding white chromaticity at the target value for the white balance color pixel degree adjustment, the method further includes: using a root-mean-square minimum error method to calculate to obtain red pixel, green pixel and blue pixel look-up tables of each of the gray scales corresponding to an adjusted white to serve as an adjusted second white balance pixel look-up table to keep a white brightness gamma value to be equal to 2.2. The white brightness gamma value to be equal to 2.2 satisfies the following formulas:

$$Y(R\text{-LUT})+Y(G\text{-LUT})+Y(B\text{-LUT})=\text{gamma}2.2; \text{ and} \quad 1)$$

$$\text{Min}((Wx-Wx0)^2+(Wy-Wy0)^2). \quad 2)$$

Y represents the Y coordinate system of the standard chromaticity system, R represents the gray scale value of the red pixel under different gray scale voltages, G represents the gray scale value of the green pixel under different gray scale voltages, B represents the gray scale value of the blue pixel under different gray scale voltages, LUT represents the gray scale value corresponding to each color of the second white balance pixel look-up table in different gray scale voltages. Wx represents the coordinate value of the white chromaticity X coordinate system, Wy represents the coordinate value of the white brightness Y coordinate system, Wx0 represents the coordinate value of the dark state white chromaticity X coordinate system, and Wy0 represents the coordinate value of the dark state white chromaticity Y coordinate system.

Furthermore, the pixel includes a red pixel, a green pixel and a blue pixel. The stimulus value of each of gray scales of each of pixels includes the three-coordinate system stimulus value of the red pixel corresponding to each of the gray scales in the standard chromaticity system, the three-coordinate system stimulus value of the green pixel corresponding to each of the gray scales in the standard chromaticity system and the three-coordinate system stimulus value of the blue pixel corresponding to each of the gray scales in the standard chromaticity system. After the step of measuring the stimulus value of each of the gray scales of each of the pixels of the panel, the method further includes: finding out reversal gray scale values of the red pixel, the green pixel and the blue pixel of each of coordinate systems in a standard chromaticity system.

After the step of defining the white highest voltage and the corresponding white chromaticity at the target value for the white balance color pixel degree adjustment, the method further includes: using a root-mean-square minimum error method to calculate to obtain red pixel, green pixel and blue pixel look-up tables of each of the gray scales corresponding to an adjusted white to serve as an adjusted second white balance pixel look-up table to keep a white brightness gamma value to be equal to 2.2. The white brightness gamma value to be equal to 2.2 satisfies the following formulas:

$$Y(R\text{-LUT})+Y(G\text{-LUT})+Y(B\text{-LUT})=\text{gamma}2.2; \text{ and} \quad 1)$$

$$\text{Min}((Wx-Wx0)^2+(Wy-Wy0)^2). \quad 2)$$

Y represents the Y coordinate system of the standard chromaticity system, R represents the gray scale value of the red pixel under different gray scale voltages, G represents the gray scale value of the green pixel under different gray scale voltages, B represents the gray scale value of the blue pixel under different gray scale voltages, and LUT represents the gray scale value corresponding to each color of the second white balance pixel look-up table in different gray scale voltages. Wx represents the coordinate value of the white chromaticity X coordinate system, Wy represents the coordinate value of the white brightness Y coordinate system, Wx0 represents the coordinate value of the dark state white chromaticity X coordinate system, and Wy0 represents the coordinate value of the dark state white chromaticity Y coordinate system.

This disclosure further discloses a white balance adjusting method of a display device. The method comprises the following steps. Measuring a stimulus value of each of gray scales of each of pixels of a panel, the pixels comprising a red pixel, a green pixel and a blue pixel. Finding out reversal gray scale values of the red pixel, the green pixel and the blue pixel of each of coordinate systems in a standard chromaticity system. Defining a highest voltage of each of the pixels at a maximum of the stimulus value. Re-defining a white highest voltage using a first white balance pixel look-up table according to the highest voltage of each of the pixels. Defining a target value for a white balance color pixel degree adjustment according to the white highest voltage and a corresponding white chromaticity. Using a root-mean-square minimum error method to calculate to obtain red pixel, green pixel and blue pixel look-up tables of each of the gray scales corresponding to an adjusted white to serve as an adjusted second white balance pixel look-up table to keep a white brightness gamma value to be equal to 2.2. And, acquiring an adjusted second white balance pixel look-up table to complete a white balance adjustment of the display device.

This disclosure further discloses a display device. The display includes a white balance adjusting module. The white balance adjusting module includes a stimulus value measuring unit, a white highest voltage defining unit and a white balance adjusting unit. The stimulus value measuring unit measures a stimulus value of each of gray scales of each of pixels of a panel. The white highest voltage defining unit defines a highest voltage of each of the pixels at a maximum of the stimulus value, and re-defines a white highest voltage using a first white balance pixel look-up table according to the highest voltage of each of the pixels. The white balance adjusting unit defines a target value for the white balance color pixel degree adjustment according to the white highest voltage and a corresponding white chromaticity, and acquires an adjusted second white balance pixel look-up table to complete a white balance adjustment of the display device.

In the white balance adjusting method of this disclosure, the previously used first white balance pixel look-up table typically sets the white highest voltage (or the gamma highest voltage) to the voltage value where the three-coordinate system is not reversed. Because a portion of the composition pixels (e.g., if the red, green and blue pixels are directed, then the blue wavelength is shorter) has the shorter wavelength, and causes the row inversion earlier than the other composition pixels. The gamma highest voltage is restricted. This disclosure defines a highest voltage of each of the pixels at a maximum of the stimulus value according to the maximum of the stimulus value, increases the highest voltage of each of the composition pixels, and thus increases the transmission rate of the overall panel. In addition, the problem of the gray scale reversal or the discontinuous look-up table can be solved.

In order to make this disclosure be understood, more comprehensive descriptions of this disclosure will be made in the following with reference to the associated drawings. Preferred embodiments of this disclosure are given in the drawings. However, this disclosure may be implemented in various forms, and is not restricted to the embodiments disclosed herein. On the contrary, the purpose of providing these embodiments is to make the contents of this disclosure be understood more comprehensively.

The features described and/or illustrated for one embodiment may be used in one or more other embodiments in the same or similar manner, may be combined with the features in other embodiments, or may be used to replace the features in other embodiments.

It should be emphasized that the term "including/comprising" as used herein represents the presence of a feature, whole piece, step or element, but does not exclude the presence or addition of one or more other features, whole pieces, steps or elements.

BRIEF DESCRIPTION OF THE DRAWINGS

The disclosure will become more fully understood from the detailed description and accompanying drawings, which are given for illustration only, and thus are not limitative of the present invention, and wherein.

DETAILED DESCRIPTION OF THE INVENTION

Specific structures and function details disclosed herein are only for the illustrative purpose for describing the exemplary embodiment of this disclosure. However, this disclosure can be specifically implemented through many replacements, and should not be explained as being restricted to only the embodiment disclosed herein.

Figure 1:
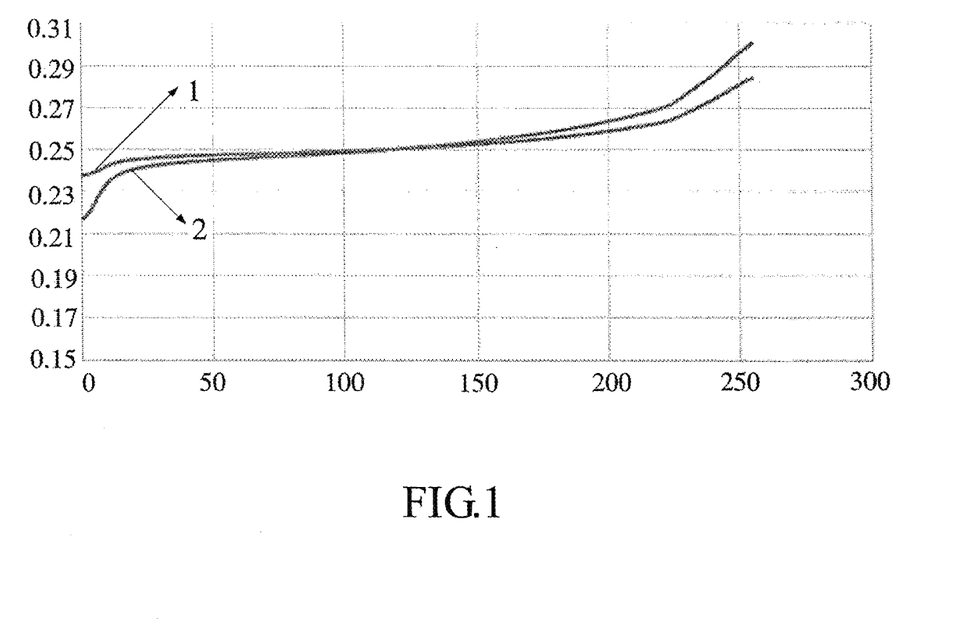
FIG. 1 is a schematic view showing a white balance chromaticity curve before the original white balance adjustment in this disclosure.
Figure 2:
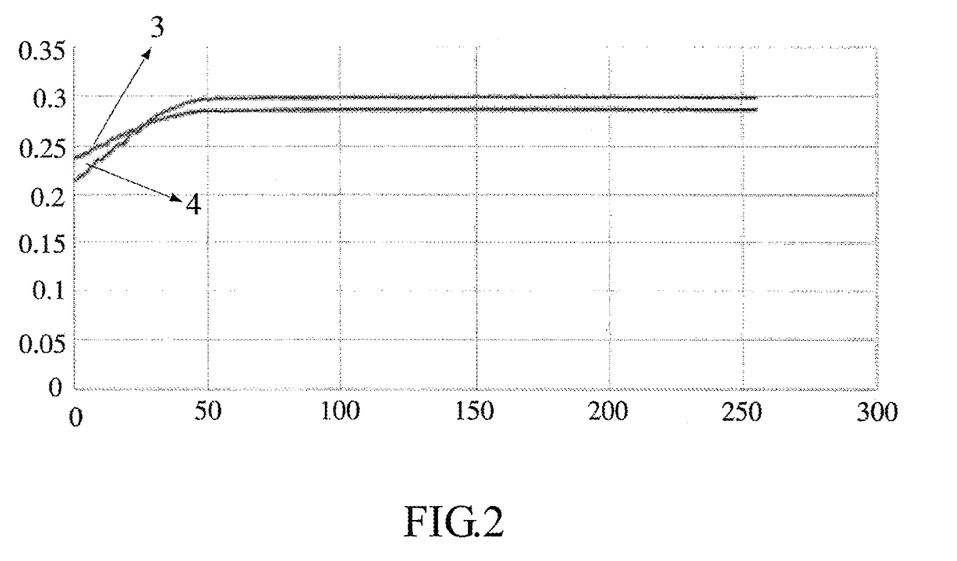
FIG. 2 is a schematic view showing an adjusted white balance chromaticity curve of the original white balance.

FIG. 1 is a schematic view showing a white balance chromaticity curve before the original white balance adjustment in this disclosure. FIG. 2 is a schematic view showing an adjusted white balance chromaticity curve of the original white balance. In FIGS. 1 and 2, symbol 1 represents a white balance first curve before the white balance adjustment, symbol 2 represents a white balance second curve before the white balance adjustment, symbol 3 represents the white balance first curve after the white balance adjustment, and symbol 4 represents the white balance second curve after the white balance adjustment.

The white balance property of the display is an important indicator of the color quality of the display. In general, the liquid crystal display needs the white balance adjustment to keep the white chromaticity of each of the gray scales at the constant level; or otherwise the color representation of the display is distorted. Referring FIGS. 1 and 2, the color representation after the white balance adjustment is better than that before the white balance adjustment, but the adjusting method still has the problem that the transmission rate of the panel is not high enough.

Thus, this disclosure discloses the following improvement solutions.

Figure 3:
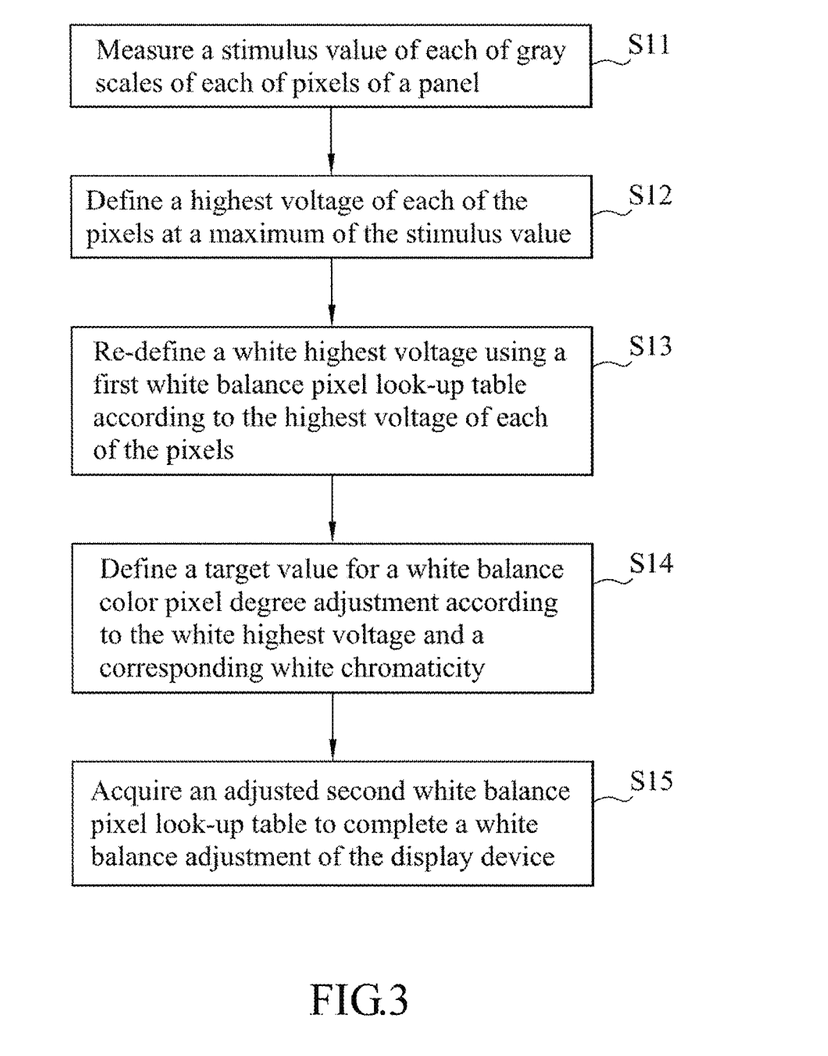
FIG. 3 is a flow chart showing a white balance adjusting method of this disclosure.
Figure 4:
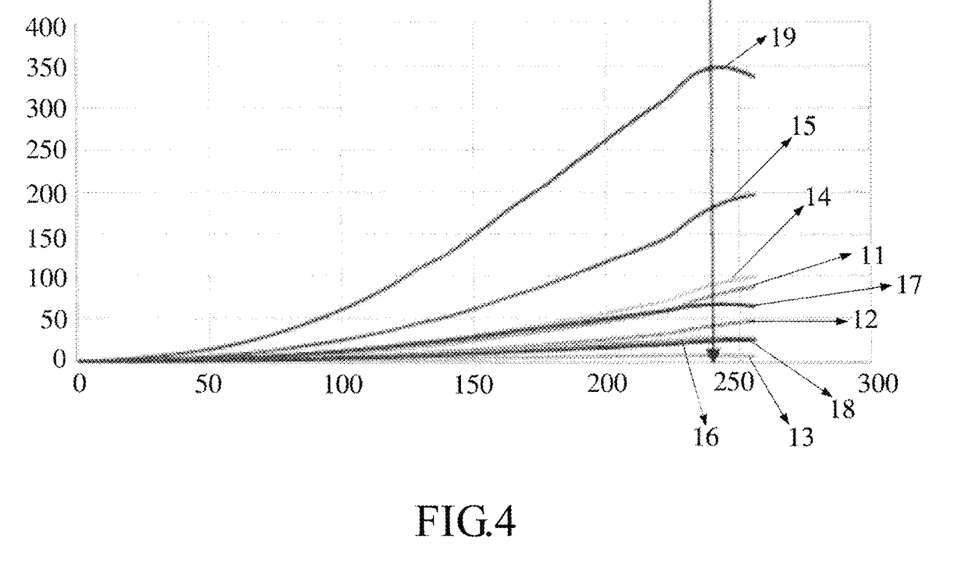
FIG. 4 is a first schematic view showing red, green and blue stimulus values of this disclosure.
Figure 5:
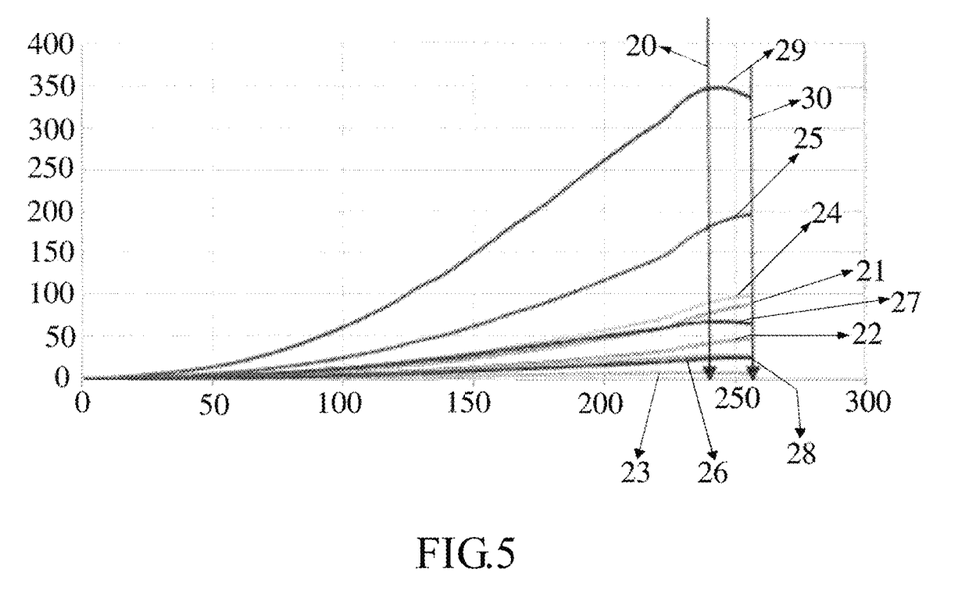
FIG. 5 is a second schematic view showing red, green and blue stimulus values of this disclosure.

FIG. 3 is a flow chart showing a white balance adjusting method of this disclosure. FIG. 4 is a first schematic view showing red, green and blue stimulus values of this disclosure. FIG. 5 is a second schematic view showing red, green and blue stimulus values of this disclosure. Symbols 11 represents the red first curve, symbol 12 represents the red second curve, symbol 13 represents the red third curve, symbol 14 represents the green first curve, symbol 15 represents the green second curve, symbol 16 represents the green third curve, symbol 17 represents the blue first curve, symbol 18 represents the blue second curve, symbol 19 represents the blue third curve; symbol 20 represents the blue highest voltage line; symbol 21 represents the red first curve, symbol 22 represents the red second curve, symbol 23 represents the red third curve, symbol 24 represents the green first curve, symbol 25 represents the green second curve, symbol 26 represents the green third curve, symbol 27 represents the blue first curve, symbol 28 represents the blue second curve, symbol 29 represents the blue third curve, and symbol 30 represents the green blue highest voltage line.

Referring FIGS. 3 to 5, this disclosure provides a white balance adjusting method of a display device, which includes the following steps:

Step S11: measuring a stimulus value of each of gray scales of each of pixels of a panel;

Step S12: defining a highest voltage of each of the pixels at a maximum of the stimulus value;

Step S13: re-defining a white highest voltage using a first white balance pixel look-up table according to the highest voltage of each of the pixels;

Step S14: defining a target value for a white balance color pixel degree adjustment according to the white highest voltage and a corresponding white chromaticity; and Step S15: acquiring an adjusted second white balance pixel look-up table to complete a white balance adjustment of the display device.

In the white balance adjusting method of this disclosure, the previously used first white balance pixel look-up table typically sets the white highest voltage (or the gamma highest voltage) to the voltage value where the three-coordinate system is not reversed. Because a portion of the composition pixels (e.g., if the red, green and blue pixels are directed, then the blue wavelength is shorter) has the shorter wavelength, and causes the row inversion earlier than the other composition pixels, the gamma highest voltage is restricted. This disclosure defines a highest voltage of each of the pixels at a maximum of the stimulus value according to the maximum of the stimulus value, increases the highest voltage of each of the composition pixels, and thus increases the transmission rate of the overall panel. In addition, the problem of the gray scale reversal or the discontinuous look-up table can be eliminated.

Optionally in this embodiment, the pixel includes a red pixel, a green pixel and a blue pixel. In this embodiment, the pixel may include a red pixel, a green pixel and a blue pixel. In this case, the wavelength of the blue pixel is shorter, and the row inversion occurs first, but the stimulus value can restrict its highest voltage to a maximum of the stimulus value. Meanwhile, the highest voltages of the green pixel and the blue pixel can be increased according to the maximum of the stimulus value, the white highest gamma voltage (the voltage of the gray scale of 255 s in the 8-bit condition) can be increased to effectively increase the transmission rate of the panel.

Optionally in this embodiment, the stimulus value of each of the gray scales of each of the pixels in the step S11 includes the three-coordinate system stimulus value of the red pixel corresponding to each of the gray scales in the standard chromaticity system, the three-coordinate system stimulus value of the green pixel corresponding to each of the gray scales in the standard chromaticity system and the three-coordinate system stimulus value of the blue pixel corresponding to each of the gray scales in the standard chromaticity system. In this embodiment, measuring the three-coordinate system stimulus values of the three primary colors corresponding to each of the gray scales in the standard chromaticity system can subsequently define the highest voltages of the red, green and blue pixels at the highest values of the stimulus values, thus increase the white highest gamma voltage and thus increase the overall transmission rate of the panel.

In this embodiment, after the step S11 of measuring the stimulus value of each of the gray scales of each of the pixels of the panel, the method optionally further includes a step of:

Finding out reversal gray scale values of the red pixel, the green pixel and the blue pixel of each of coordinate systems in a standard chromaticity system. In this embodiment, because the blue wavelength is shorter, it is usually reversed earlier than the red and green. So, the voltage before the blue reversal point is selected, and the gamma highest voltage is restricted to the specific position of about the gray scale of 240. This disclosure defines the highest voltage of each of the pixels at a maximum of the stimulus value according to the maximum of the stimulus value, thereby restricting the highest voltage of the blue look-up table, while increasing the highest voltages of the green look-up table and the red look-up table. Thus, the white highest gamma voltage is increased (the voltage of the gray scale of 255 in the 8-bit condition) to increase the transmission rate of the overall panel without the problem of the gray scale reversal or the discontinuous look-up table.

In this embodiment, after the step S14 of defining the white highest voltage and the corresponding white chromaticity at the target value for the white balance color pixel degree adjustment, the method optionally further includes a step of:

Using a root-mean-square minimum error method to calculate to obtain red pixel, green pixel and blue pixel look-up tables of each of the gray scales corresponding to an adjusted white to serve as an adjusted second white balance pixel look-up table to keep a white brightness gamma value to be equal to 2.2. In this embodiment, the white highest voltage obtained using the second white balance pixel look-up table can reach the voltage level of the gray scale of 255 in the 8-bit condition. Compared with the brightness falling at about the gray scale of 240 obtained using the first white balance pixel look-up table, the enhancement is about 5%, so that the transmission rate and the color representation performance of the panel are effectively enhanced.

Optionally in this embodiment, the white brightness gamma value equal to 2.2 satisfies the following formulas:

$$Y(R\text{-LUT})+Y(G\text{-LUT})+Y(B\text{-LUT})=\text{gamma}2.2; \text{ and} \qquad 1)$$

$$\text{Min}((Wx-Wx0)^2+(Wy-Wy0)^2). \qquad 2)$$

Y represents the Y coordinate system in the standard chromaticity system, R represents the gray scale value of the red pixel under different gray scale voltages, G represents the gray scale value of the green pixel under the different gray scale voltages, B represents the gray scale value of the blue pixel under different gray scale voltages, and LUT represents the gray scale value corresponding to each color of the second white balance pixel look-up table in different gray scale voltages; and Wx represents the coordinate value of the white chromaticity X coordinate system, Wy represents the coordinate value of the white brightness Y coordinate system, Wx0 represents the coordinate value of the dark state white chromaticity X coordinate system, and Wy0 represents the coordinate value of the dark state white chromaticity Y coordinate system. In this embodiment, the white balance restricting condition similar to the first white balance pixel look-up table is used, but the adjustment is performed.

Optionally in this embodiment, the pixel includes a red pixel, a green pixel and a blue pixel.

A stimulus value of each of gray scales of each of pixels includes the three-coordinate system stimulus value of the red pixel corresponding to each of the gray scales in the standard chromaticity system, the three-coordinate system stimulus value of the green pixel corresponding to each of the gray scales in the standard chromaticity system and the three-coordinate system stimulus value of the blue pixel corresponding to each of the gray scales in the standard chromaticity system.

After the step S11 of measuring the stimulus value of each of the gray scales of each of the pixels of the panel, the method further includes a step of: finding out reversal gray scale values of the red pixel, the green pixel and the blue pixel of each of coordinate systems in a standard chromaticity system.

Optionally in this embodiment, the pixel includes a red pixel, a green pixel and a blue pixel.

A stimulus value of each of gray scales of each of pixels includes the three-coordinate system stimulus value of the red pixel corresponding to each of the gray scales in the standard chromaticity system, the three-coordinate system stimulus value of the green pixel corresponding to each of the gray scales in the standard chromaticity system and the three-coordinate system stimulus value of the blue pixel corresponding to each of the gray scales in the standard chromaticity system.

After the step of defining the white highest voltage and the corresponding white chromaticity at the target value for the white balance color pixel degree adjustment, the method further includes the following step:

Using a root-mean-square minimum error method to calculate to obtain red pixel, green pixel and blue pixel look-up tables of each of the gray scales corresponding to an adjusted white to serve as an adjusted second white balance pixel look-up table to keep a white brightness gamma value to be equal to 2.2.

The white brightness gamma value to be equal to 2.2 satisfies the following formulas:

$$Y(R\text{-LUT})+Y(G\text{-LUT})+Y(B\text{-LUT})=\text{gamma}2.2; \text{ and} \quad \quad 1)$$

$$\text{Min}((Wx-Wx0)^2+(Wy-Wy0)^2). \quad \quad 2)$$

Y represents the Y coordinate system of the standard chromaticity system, R represents the gray scale value of the red pixel under different gray scale voltages, G represents the gray scale value of the green pixel under different gray scale voltages, B represents the gray scale value of the blue pixel under different gray scale voltages, LUT represents the gray scale value corresponding to each color of the second white balance pixel look-up table in different gray scale voltages; and Wx represents the coordinate value of the white chromaticity X coordinate system, Wy represents the coordinate value of the white brightness Y coordinate system, Wx0 represents the coordinate value of the dark state white chromaticity X coordinate system, and Wy0 represents the coordinate value of the dark state white chromaticity Y coordinate system.

Optionally in this embodiment, the pixel includes a red pixel, a green pixel and a blue pixel.

A stimulus value of each of gray scales of each of pixels includes the three-coordinate system stimulus value of the red pixel corresponding to each of the gray scales in the standard chromaticity system, the three-coordinate system stimulus value of the green pixel corresponding to each of the gray scales in the standard chromaticity system and the three-coordinate system stimulus value of the blue pixel corresponding to each of the gray scales in the standard chromaticity system. After the step of measuring the stimulus value of each of the gray scales of each of the pixels of the panel, the method further includes a step of: finding out reversal gray scale values of the red pixel, the green pixel and the blue pixel of each of coordinate systems in a standard chromaticity system.

After the step of defining the white highest voltage and the corresponding white chromaticity at the target value for the white balance color pixel degree adjustment, the method further includes the following step:

Using a root-mean-square minimum error method to calculate to obtain red pixel, green pixel and blue pixel look-up tables of each of the gray scales corresponding to an adjusted white to serve as an adjusted second white balance pixel look-up table to keep a white brightness gamma value to be equal to 2.2.

The white brightness gamma value to be equal to 2.2 satisfies the following formulas:

$$Y(R\text{-LUT})+Y(G\text{-LUT})+Y(B\text{-LUT})=\text{gamma}2.2; \text{ and} \quad \quad 1)$$

$$\text{Min}((Wx-Wx0)^2+(Wy-Wy0)^2). \quad \quad 2)$$

Y represents the Y coordinate system of the standard chromaticity system, R represents the gray scale value of the red pixel under different gray scale voltages, G represents the gray scale value of the green pixel under different gray scale voltages, and B represents the gray scale value of the blue pixel under different gray scale voltages. LUT represents the gray scale value corresponding to each color of the second white balance pixel look-up table in different gray scale voltages. Wx represents the coordinate value of the white chromaticity X coordinate system, Wy represents the coordinate value of the white brightness Y coordinate system, Wx0 represents the coordinate value of the dark state white chromaticity X coordinate system, and Wy0 represents the coordinate value of the dark state white chromaticity Y coordinate system.

Figure 6:
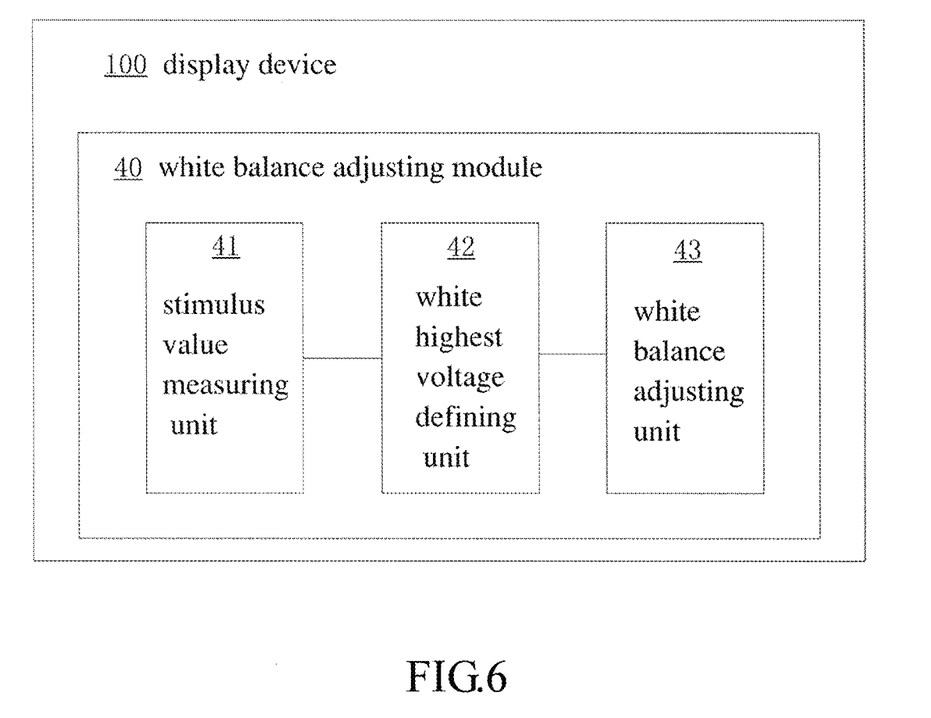
FIG. 6 is a schematic view showing a display device of this disclosure.

FIG. 6 is a schematic view showing a display device of this disclosure. Referring to FIG. 6 in conjunction with FIGS. 1 to 5, it is obtained that this disclosure further discloses a display device 100, the display device 100 includes a white balance adjusting module 40, which includes: a stimulus value measuring unit 41 for measuring a stimulus value of each of gray scales of each of pixels of a panel; a white highest voltage defining unit 42 for defining a highest voltage of each of the pixels at a maximum of the stimulus value, and re-defining a white highest voltage using a first white balance pixel look-up table according to the highest voltage of each of the pixels; and a white balance adjusting unit 43 for defining a target value for the white balance color pixel degree adjustment according to the white highest voltage and a corresponding white chromaticity, and acquiring adjusted second white balance pixel look-up table to complete a white balance adjustment of the display device.

The panel of the disclosure can be a Twisted Nematic panel (TN panel), an In-Plane Switching panel (IPS panel), a Vertical Alignment panel (VA panel), a Multi-domain Vertical Alignment panel (MVA panel), and any other suitable panels.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A white balance adjusting method of a display device, comprising:
   measuring a stimulus value of each of gray scales of each of pixels of a panel;
   defining a highest voltage of each of the pixels at a maximum of the stimulus value;
   re-defining a white highest voltage using a first white balance pixel look-up table according to the highest voltage of each of the pixels;
   defining a target value for a white balance color pixel degree adjustment according to the white highest voltage and a corresponding white chromaticity; and
   acquiring an adjusted second white balance pixel look-up table to complete a white balance adjustment of the display device.

2. The white balance adjusting method of a display device according to claim 1, wherein the pixels comprise a red pixel, a green pixel, and a blue pixel.

3. The white balance adjusting method of a display device according to claim 2, wherein a stimulus value of each of gray scales of each of pixels comprises a three-coordinate system stimulus value of the red pixel corresponding to each of the gray scales in a standard chromaticity system, a three-coordinate system stimulus value of the green pixel corresponding to each of the gray scales in a standard chromaticity system and a three-coordinate system stimulus value of the blue pixel corresponding to each of the gray scales in a standard chromaticity system.

4. The white balance adjusting method of a display device according to claim 2, wherein, after measuring the stimulus value of each of the gray scales of each of the pixels of the panel, the method further comprises:
finding out reversal gray scale values of the red pixel, the green pixel and the blue pixel of each of coordinate systems in a standard chromaticity system.

5. The white balance adjusting method of a display device according to claim 2, wherein, after defining the white highest voltage and the corresponding white chromaticity at the target value for the white balance color pixel degree adjustment, the method further comprises:
using a root-mean-square minimum error method to calculate to obtain red pixel, green pixel and blue pixel look-up tables of each of the gray scales corresponding to an adjusted white to serve as an adjusted second white balance pixel look-up table to keep a white brightness gamma value to be equal to 2.2.

6. The white balance adjusting method of a display device according to claim 5, wherein the white brightness gamma value to be equal to 2.2 satisfies the following formulas:

$$Y(R\text{-LUT}) + Y(G\text{-LUT}) + Y(B\text{-LUT}) = \text{gamma}2.2; \text{ and} \quad 1)$$

$$\text{Min}((Wx-Wx0)^2 + (Wy-Wy0)^2), \quad 2)$$

wherein Y represents the Y coordinate system of the standard chromaticity system, R represents the gray scale value of the red pixel under different gray scale voltages, G represents the gray scale value of the green pixel under different gray scale voltages, B represents the gray scale value of the blue pixel under different gray scale voltages, LUT represents the gray scale value corresponding to each color of the second white balance pixel look-up table in different gray scale voltages; and Wx represents the coordinate value of the white chromaticity X coordinate system, Wy represents the coordinate value of the white brightness Y coordinate system, Wx0 represents the coordinate value of the dark state white chromaticity X coordinate system, and Wy0 represents the coordinate value of the dark state white chromaticity Y coordinate system.

7. The white balance adjusting method of a display device according to claim 1, wherein the pixels comprise a red pixel, a green pixel, and a blue pixel; and
a stimulus value of each of gray scales of each of pixels comprises a three-coordinate system stimulus value of the red pixel corresponding to each of the gray scales in the standard chromaticity system, a three-coordinate system stimulus value of the green pixel corresponding to each of the gray scales in the standard chromaticity system, and a three-coordinate system stimulus value of the blue pixel corresponding to each of the gray scales in the standard chromaticity system; and
after measuring the stimulus value of each of the gray scales of each of the pixels of the panel, the method further comprising:
finding out reversal gray scale values of the red pixel, the green pixel and the blue pixel of each of coordinate systems in a standard chromaticity system.

8. The white balance adjusting method of a display device according to claim 1, wherein the pixels comprise a red pixel, a green pixel, and a blue pixel; and
a stimulus value of each of gray scales of each of pixels comprises the three-coordinate system stimulus value of the red pixel corresponding to each of the gray scales in the standard chromaticity system, the three-coordinate system stimulus value of the green pixel corresponding to each of the gray scales in the standard chromaticity system, and the three-coordinate system stimulus value of the blue pixel corresponding to each of the gray scales in the standard chromaticity system; and
after defining the white highest voltage and the corresponding white chromaticity at the target value for the white balance color pixel degree adjustment, the method further comprising:
using a root-mean-square minimum error method to calculate to obtain red pixel, green pixel and blue pixel look-up tables of each of the gray scales corresponding to an adjusted white to serve as an adjusted second white balance pixel look-up table to keep a white brightness gamma value to be equal to 2.2;
the white brightness gamma value to be equal to 2.2 satisfies the following formulas:

$$Y(R\text{-LUT}) + Y(G\text{-LUT}) + Y(B\text{-LUT}) = \text{gamma}2.2; \text{ and} \quad 1)$$

$$\text{Min}((Wx-Wx0)^2 + (Wy-Wy0)^2), \quad 2)$$

wherein Y represents the Y coordinate system of the standard chromaticity system, R represents the gray scale value of the red pixel under different gray scale voltages, G represents the gray scale value of the green pixel under different gray scale voltages, B represents the gray scale value of the blue pixel under different gray scale voltages, LUT represents the gray scale value corresponding to each color of the second white balance pixel look-up table in different gray scale voltages; and Wx represents the coordinate value of the white chromaticity X coordinate system, Wy represents the coordinate value of the white brightness Y coordinate system, Wx0 represents the coordinate value of the dark state white chromaticity X coordinate system, and Wy0 represents the coordinate value of the dark state white chromaticity Y coordinate system.

9. The white balance adjusting method of a display device according to claim 1, wherein the pixels comprise a red pixel, a green pixel, and a blue pixel; and
a stimulus value of each of gray scales of each of pixels comprises a three-coordinate system stimulus value of the red pixel corresponding to each of the gray scales in the standard chromaticity system, a three-coordinate system stimulus value of the green pixel corresponding to each of the gray scales in the standard chromaticity system, and a three-coordinate system stimulus value of the blue pixel corresponding to each of the gray scales in the standard chromaticity system; and
after measuring the stimulus value of each of the gray scales of each of the pixels of the panel, the method further comprising:

finding out reversal gray scale values of the red pixel, the green pixel, and the blue pixel of each of coordinate systems in a standard chromaticity system;

after defining the white highest voltage and the corresponding white chromaticity at the target value for the white balance color pixel degree adjustment, the method further comprising:

using a root-mean-square minimum error method to calculate to obtain red pixel, green pixel, and blue pixel look-up tables of each of the gray scales corresponding to an adjusted white to serve as an adjusted second white balance pixel look-up table to keep a white brightness gamma value to be equal to 2.2;

the white brightness gamma value to be equal to 2.2 satisfies the following formulas:

$Y(R\text{-LUT}) + Y(G\text{-LUT}) + Y(B\text{-LUT}) = \text{gamma}2.2$; and  1)

$\text{Min}((Wx-Wx0)^2 + (Wy-Wy0)^2)$,  2)

wherein Y represents the Y coordinate system of the standard chromaticity system, R represents the gray scale value of the red pixel under different gray scale voltages, G represents the gray scale value of the green pixel under different gray scale voltages, B represents the gray scale value of the blue pixel under different gray scale voltages, LUT represents the gray scale value corresponding to each color of the second white balance pixel look-up table in different gray scale voltages; and Wx represents the coordinate value of the white chromaticity X coordinate system, Wy represents the coordinate value of the white brightness Y coordinate system, Wx0 represents the coordinate value of the dark state white chromaticity X coordinate system, and Wy0 represents the coordinate value of the dark state white chromaticity Y coordinate system.

10. A white balance adjusting method of a display device, comprising:

measuring a stimulus value of each of gray scales of each of pixels of a panel, wherein the pixels comprises a red pixel, a green pixel, and a blue pixel;

finding out reversal gray scale values of the red pixel, the green pixel, and the blue pixel of each of coordinate systems in a standard chromaticity system;

defining a highest voltage of each of the pixels at a maximum of the stimulus value;

re-defining a white highest voltage using a first white balance pixel look-up table according to the highest voltage of each of the pixels;

defining a target value for a white balance color pixel degree adjustment according to the white highest voltage and a corresponding white chromaticity;

using a root-mean-square minimum error method to calculate to obtain red pixel, green pixel, and blue pixel look-up tables of each of the gray scales corresponding to an adjusted white to serve as an adjusted second white balance pixel look-up table to keep a white brightness gamma value to be equal to 2.2; and acquiring an adjusted second white balance pixel look-up table to complete a white balance adjustment of the display device.

11. The white balance adjusting method of a display device according to claim 10, wherein the white brightness gamma value to be equal to 2.2 satisfies the following formulas:

$Y(R\text{-LUT}) + Y(G\text{-LUT}) + Y(B\text{-LUT}) = \text{gamma}2.2$; and  1)

$\text{Min}((Wx-Wx0)^2 + (Wy-Wy0)^2)$,  2)

wherein Y represents the Y coordinate system of the standard chromaticity system, R represents the gray scale value of the red pixel under different gray scale voltages, G represents the gray scale value of the green pixel under different gray scale voltages, B represents the gray scale value of the blue pixel under different gray scale voltages, LUT represents the gray scale value corresponding to each color of the second white balance pixel look-up table in different gray scale voltages; and Wx represents the coordinate value of the white chromaticity X coordinate system, Wy represents the coordinate value of the white brightness Y coordinate system, Wx0 represents the coordinate value of the dark state white chromaticity X coordinate system, and Wy0 represents the coordinate value of the dark state white chromaticity Y coordinate system.

12. A display device, comprising:

a white balance adjusting module, wherein the white balance adjusting module comprises:

a stimulus value measuring unit for measuring a stimulus value of each of gray scales of each of pixels of the panel;

a white highest voltage defining unit for defining a highest voltage of each of the pixels at a maximum of the stimulus value and re-defining a white highest voltage using a first white balance pixel look-up table according to the highest voltage of each of the pixels; and a white balance adjusting unit for defining a target value for the white balance color pixel degree adjustment according to the white highest voltage and a corresponding white chromaticity, and acquiring an adjusted second white balance pixel look-up table to complete a white balance adjustment of the display device.

13. The display device according to claim 12, wherein the pixels comprises a red pixel, a green pixel and a blue pixel.

14. The display device according to claim 13, wherein the stimulus value of each of gray scales of each of pixels comprises a three-coordinate system stimulus value of the red pixel corresponding to each of the gray scales in the standard chromaticity system, a three-coordinate system stimulus value of the green pixel corresponding to each of the gray scales in the standard chromaticity system, and a three-coordinate system stimulus value of the blue pixel corresponding to each of the gray scales in the standard chromaticity system.

15. The display device according to claim 13, wherein the stimulus value measuring unit finds out reversal gray scale values of the red pixel, the green pixel, and the blue pixel of each of coordinate systems in a standard chromaticity system.

16. The display device according to claim 13, wherein the white balance adjusting unit uses a root-mean-square minimum error method to calculate and obtain red pixel, green pixel, and blue pixel look-up tables of each of the gray scales corresponding to an adjusted white to serve as an adjusted second white balance pixel look-up table to keep a white brightness gamma value to be equal to 2.2.

17. The display device according to claim 16, wherein the white brightness gamma value to be equal to 2.2 satisfies the following formulas:

$Y(R\text{-LUT}) + Y(G\text{-LUT}) + Y(B\text{-LUT}) = \text{gamma}2.2$; and  1)

$\text{Min}((Wx-Wx0)^2 + (Wy-Wy0)^2)$;  2)

wherein Y represents the Y coordinate system of the standard chromaticity system, R represents the gray scale value of the red pixel under different gray scale voltages, G represents the gray scale value of the green pixel under different gray scale voltages, B represents the gray scale value of the blue pixel under different gray scale voltages, LUT represents the gray scale value corresponding to each color of the second white balance pixel look-up table in different gray scale voltages; and Wx represents the coordinate value of the white chromaticity X coordinate system, Wy represents the coordinate value of the white brightness Y coordinate system, Wx0 represents the coordinate value of the dark state white chromaticity X coordinate system, and Wy0 represents the coordinate value of the dark state white chromaticity Y coordinate system.

\* \* \* \* \*